United States Patent Office 3,091,901
Patented June 4, 1963

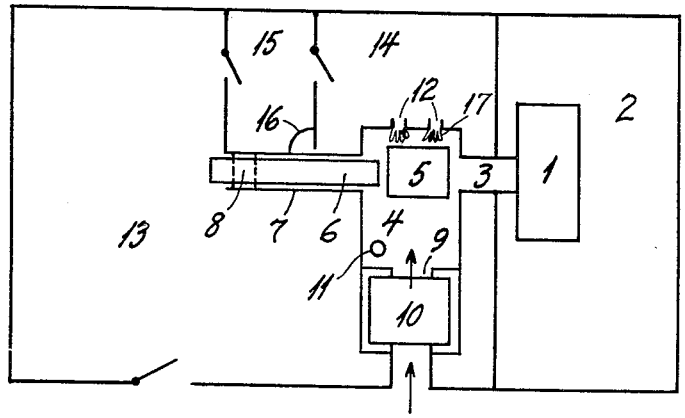

3,091,901
METHOD AND MEANS FOR PRODUCING ASEPTICALLY PACKAGED STERILE PLASTIC ARTICLES
Karl Oskar Lennart Silverstolpe, Skytteholmsvagen 26, Solna, Sweden
Filed Oct. 21, 1960, Ser. No. 65,251
2 Claims. (Cl. 53—22)

The present invention relates to a method of producing aseptically packaged articles made of plastic, and to means for carrying out the method.

Polyethylene, polystyrene and others of the most commonly used thermoplastics cannot be heated above approximately 70 to 80° C. without softening or melting, whereby articles made thereof will be deformed. This temperature is insufficient to cause a satisfactory sterilization. Articles made of other plastics which are heatable to a temperature involving a fully satisfactory sterilization are considerably more costly to manufacture and therefore frequently cannot be utilized for economical reasons.

Articles made of the first-mentioned kind of plastics, therefore, have been sterilized in the past by means of bactericides, usually in a gaseous state. This procedure, however, is circumstantial, costly and not quite harmless.

The invention solves in a novel way the problem of producing aseptically packaged articles made of plastics which soften or melt before sterilization temperature is reached. According to the invention the plastic articles, from a moulding machine, wherein they are moulded from a plastic compound heated to a sterilizing temperature, are introduced directly into a sterile-chamber into which sterile air or gas is blown so that a positive pressure prevails in the chamber, and are enclosed in sterile envelopes when in said chamber, from which they are subsequently removed.

Thus, what is essential according to the invention is that the very moulding procedure in which the plastic material is heated to a relatively high temperature quite sufficient for sterilization, for instance about 200° C., is utilized as a sterilizing step, the moulded articles being packaged directly following this procedure and under conditions such as to prevent the articles from coming in contact with bacteria-carrying media and getting infected therewith before they are packaged in sterile envelopes.

For elucidating the invention, reference is had to the accompanying drawing which diagrammatically illustrates a plant for carrying out the method.

Designated by 1 is a moulding machine which is arranged in a separate room 2. In the machine the plastic compound is injected at a temperature of, for example, about 200° C. into moulds which are thus heated to a temperature sufficient for sterilization. From the moulding machine the plastic articles automatically removed from the moulds are fed through a duct 3 into a sterile-chamber 4 within which the packaging step is carried out.

The chamber is provided with a table 5 onto which the plastic articles are deposited, and also with a conveyer 6 which is passed out through a duct 7 having a suitable lock or sluice arrangement 8. Numeral 9 designates an opening in one chamber wall which communicates with a sterilizing unit 10 from which sterile air is blown into the chamber 4 so that a certain positive pressure prevails therein, and bacteria-carrying air is thus prevented from leaking into the chamber. The chamber may further have disposed therein lamps 11 radiating bactericidal ultraviolet rays. By 12 are designated openings formed in the chamber wall opposite the sterilizing unit 10, and through which openings the operator can introduce his hands coated by sterile protective gloves 17 in order, after the plastic articles deposited on the table 5 having cooled down sufficiently, to wrap these articles in sterile envelopes, for instance plastic bags or the like, which are stored at an easily accessible place within the chamber. After thus having packaged the articles, they are placed on the conveyer 6 which will lock the same out of the chamber through the duct 7.

The duct 7 opens into a packing room 13 where the inherently sterile plastic articles wrapped in their sterile envelopes can be packed into suitable cardboard boxes or the like for shipping.

Where, as assumed in the foregoing, the packaging is carried out manually, the operator is housed in a sterile room 14 beside the sterile-chamber 4. Into this room 14 he may enter from the packing room 13 through a compartment 15 serving as a lock and within which he changes his shoes and coat for clean ones and puts a clean hood on his head. Numeral 16 designates a wash stand provided within the lock compartment 15. One side of the lock compartment 15, suitably that side at which the wash stand 16 is disposed, is used for keeping clean protective clothing and shoes to be worn within the sterile room 14, whereas the opposite side is available for clothes and shoes which are worn outside the sterile room 14.

It is possible also, of course, instead of manually enclosing the plastic articles in sterile envelopes within the chamber 4, to provide in this chamber machines adapted to carry out automatically the packaging and locking-out of the articles packaged.

What I claim is:
1. A method for producing aseptically packaged solid sterile articles of thermoplastic material comprising heating the thermoplastic material to a molding temperature which is above the temperature necessary for sterilization so as to effect sterilization of the thermoplastic material, molding the thermoplastic material into articles, introducing the molded articles while sterile into a sterile packaging chamber, blowing sterile air into said sterile packaging chamber to create a slight superatmospheric pressure therein as well as to keep said sterile packaging chamber in a sterile condition, enclosing the sterile molded articles while in said sterile packaging chamber into sterile envelopes so as to form sterile packaged articles, and removing said sterile packaged articles from said sterile packaging chamber.

2. A method as described in claim 1, comprising the further step of irradiating said article by bactericidal ultraviolet rays in said sterile packaging chamber.

References Cited in the file of this patent

UNITED STATES PATENTS

| 2,816,837 | Holsman | Dec. 17, 1957 |
| 2,918,770 | Stocker | Dec. 29, 1959 |
| 3,015,917 | Moore | Jan. 9, 1962 |

FOREIGN PATENTS

| 146,011 | Austria | June 10, 1936 |